Figure 1:
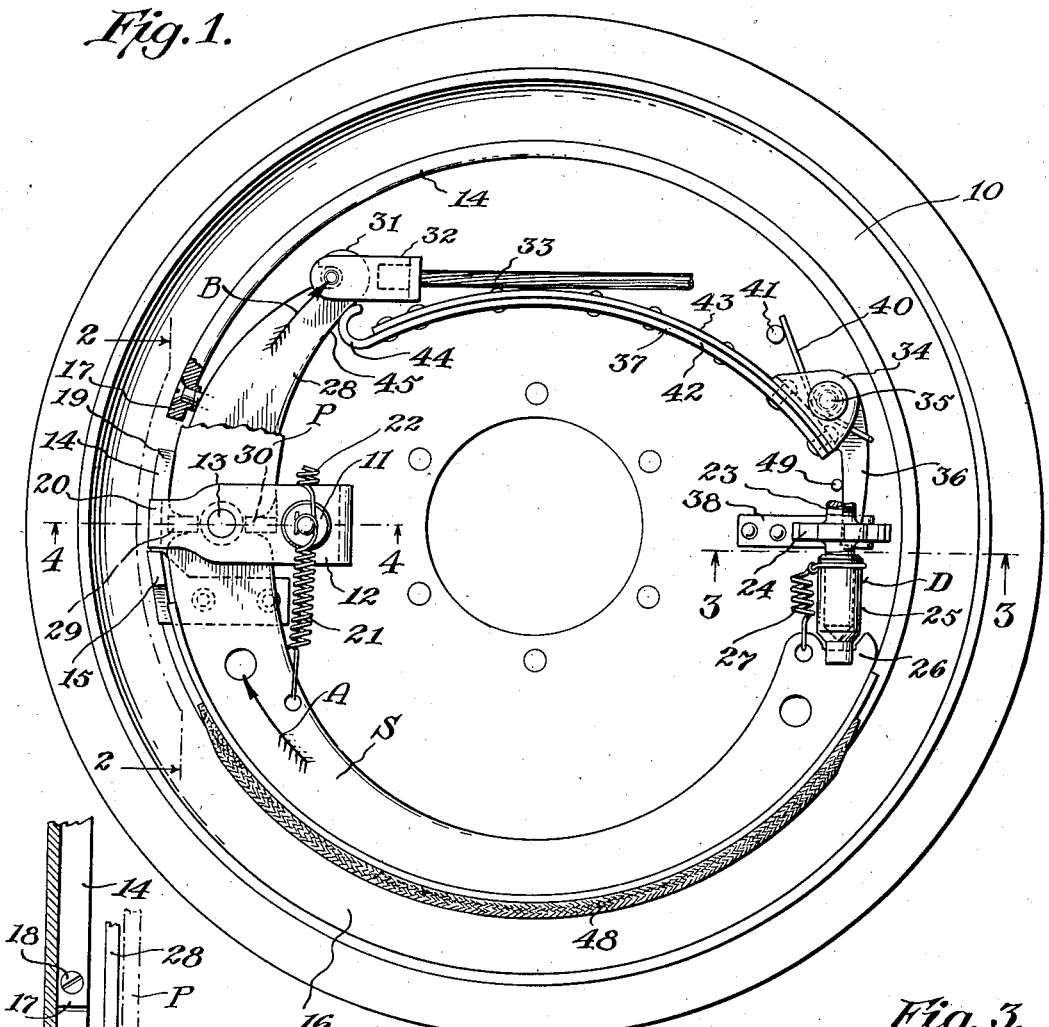

Oct. 29, 1935.  G. L. SMITH  2,019,101

AUTOMATIC BRAKE MECHANISM FOR VEHICLES

Filed Dec. 12, 1932

Inventor
George L. Smith
By Henry T. Bright
Attorney

Patented Oct. 29, 1935

2,019,101

UNITED STATES PATENT OFFICE 2,019,101

AUTOMATIC BRAKE MECHANISM FOR VEHICLES

George L. Smith, South Bend, Ind., assignor to United States Ordnance Company, Washington, D. C., a corporation of Virginia Application December 12, 1932, Serial No. 646,902

10 Claims. (Cl. 188—79.5)

My invention relates to automatically adjustable brakes for motor automobiles and airplanes.

The object of my invention is to provide a brake mechanism embodying thermo-controlled means to vary the braking torque and also thermo-controlled means to delay or arrest the adjusting action of the brake mechanism.

In my Patent 1,792,773 of Feb. 17, 1931, I show mechanism for yieldably anchoring a brake member, the yielding of which causes a reduction in the expanding action of the brake setting means. This yielding movement is accomplished by interconnecting the two anchoring mechanisms of a pair of brakes. In my present application I show means whereby the anchoring mechanism of each brake of a motor vehicle or airplane moves independently of the anchoring mechanism of any of the other brakes, being controlled by a positioning member which expands under the influence of the heating action of its brake to a greater or less extent than the other parts of the brake in which it is embodied.

In my Patent 1,850,898 of Mar. 22, 1932, I describe a structure for controlling the automatic adjustment of a pair of brakes whereby the adjustment of the stronger brake is arrested or delayed until the weaker one is properly adjusted. This basic idea covered by the aforesaid patent may be accomplished in a variety of ways, and one of these ways as described herein embodies a two-arm ratchet lever one arm of which is so constructed that as it is heated it bends away from the brake applying lever which actuates it so that its effective adjusting movement is retarded.

In the drawing chosen to illustrate my invention

Figures 2, 4:
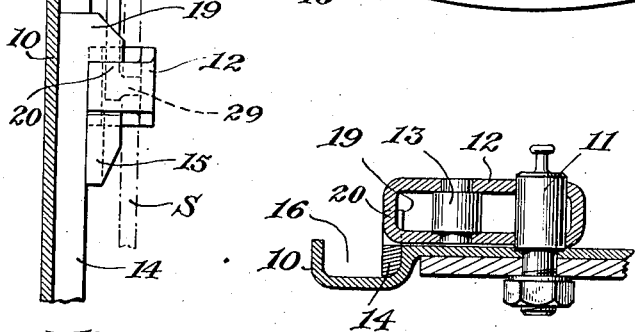
Figure 3:
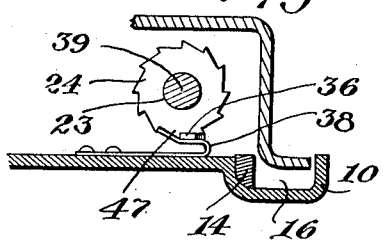

Fig. 1 is an elevation of a right hand brake with brake drum removed, the upper half of brake being cut away to disclose certain parts;

Fig. 2, a section on line 2—2 of Fig. 1;

Fig. 3, a section on line 3—3 of Fig. 1 with brake drum outlined; and

Fig. 4, a section on line 4—4 of Fig. 1.

The numeral 10 represents the backing plate which carries the brake parts. The anchoring mechanism consists of the pivot stud 11 carried by the backing plate, the anchor lever 12 pivoted on 11 and carrying the abutment 13, the expansion strap 14 of aluminum or some other metal having a high co-efficient of expansion, and the clip 15. As shown in Figs. 3 and 4, strap 14 lies in the inner angle of a groove 16 of the backing plate and the end 17 thereof is secured to the backing plate by the cap screw 18. The other end of the strap 14 has a hook 19, (Fig. 2) which engages the outer end 20 of the anchor lever 12 and prevents this lever from rotating in a clockwise direction about the stud 11. The clip 15 is riveted to the backing plate and also engages the end 20 to prevent the lever 12 from rotating in a counter-clockwise direction.

The brake shoe is of the duo-servo type consisting of a primary shoe P and a secondary shoe S. The webs of these shoes bear against the abutment 13 of the anchoring mechanism when the brake is in released position, being held against it by the release springs 21 and 22. The right hand ends of shoes P and S are connected by an adjustable compression device D consisting of a right and left handed screw 23 with a ratchet wheel 24 at its middle portion and two sleeves 25 which seat in suitable recesses in the ends 26 of the webs. The sleeves are held in these recesses by the springs 27. In Fig. 1 the sleeve 25 for the shoe P is cut away to show other parts of the mechanism, but it will be understood that the appearance of the upper part not shown is the same as the lower part.

A brake expanding device is shown consisting of a lever 28 straddling the abutment 13 and having two lugs 29 and 30 which occupy the gaps between the ends of the webs P and S. The main part of this lever, as shown in Figure 1, lies just below the web P and has a hook 31 at its upper end to which is hooked the terminal connection 32 of an operating pull wire 33.

An automatic adjusting lever 34 is provided to adjust the ratchet wheel 24. It is mounted on a pivot 35 secured to the backing plate 10 at a point substantially in line with the axis of the ratchet wheel and has a short arm 36 and a long arm 37. The arm 36 extends between the backing plate and ratchet wheel so as to effect engagement with the ratchet teeth of said wheel. A spring pawl 38 secured to the backing plate 10, is bent over on itself to form a support for the arm 36 and extends beyond it to engage the next tooth of the ratchet wheel beyond the one engaged by the arm 36. This permits the centre 39 of the screw 23 to shift a slight amount in a plane parallel to the backing plate without appreciably affecting the action of the automatic adjustment. This is an important feature of my invention as the screw 23 not only has a certain amount of lateral travel as the brake is applied, but also gradually shifts its position inward as the sleeves 25 travel out on the screw 23. The arm 36 also locks the ratchet wheel from rotating in either direction in a manner similar to that described in my Patent 1,874,131 of Aug. 30, 1932. A torsion spring 40 is mounted on the pivot 35 to operate the ratchet lever in turning the ratchet wheel 24. One end of this spring engages the arm 36 and the other end a pin 41 secured to the backing plate.

The long arm 37 of lever 34 is constructed of two metal strips 42 and 43 of different co-efficients of expansion and secured together from end to end, the strip 43 having the greater coefficient so that the arm will increase its curvature as it heats up and cause the end 44 to bend away from the right edge 45 of lever 28.

The mechanism operates as follows:—The brake is applied by a pull on wire 33 which swings the head 31 of lever 28 to the right and downward. The lever 28 pivots about the lug 30 and the lug 29 forces the web P away from the abutment 13 and expands the shoes. As the lever 28 swings to the right it presses down on end 44 of ratchet lever 34, rotating it in a counter-clockwise direction. The arm 36 is thus moved away from the ratchet tooth 47 (Fig. 3), and when this movement becomes sufficiently great, due to wear of the brake lining 48, the next tooth to the right will be engaged. When the brake is subsequently released, the spring 40 will rotate the lever 34 back to its initial position against the stop 49 (Fig. 1) and rotate the ratchet wheel a distance of one tooth.

When the brake heats up due to continued braking the arm 37 will curve away from the edge 45 of the brake lever so that the ratchet lever will not act as soon in picking up a new tooth. Also the strap 14 will increase in length permitting the anchor lever 12 to be rotated clockwise (Fig. 1) a small amount by the normal pressure of the brake against the abutment 13 in the direction of the arrow A. As a result the entire brake shoe with its lever 28 will rotate clockwise (Fig. 1) in proportion to the amount of yielding of the abutment 13 so that the head 31 of lever 28 will move up and towards the terminal connection 32 of the pull wire 33, in the direction of arrow B. This movement has the effect of reducing the tension in the wire 33 so that the brake pressure drops and the braking action is decreased. The edge 45 of the brake lever also travels up and away from the end 44 of the ratchet lever so that it will not operate this lever so quickly. Thus the expansion of the strap 14 also acts to retard the action of the adjusting device D. This expansion of the strap due to heat is known to be very small and a strap of considerable length is necessary to provide any appreciable extension. For this reason I utilize a circular member extending around the circumference of the brake and in close proximity to the braking surface of the brake shoe, and while this member is shown positioned in the groove 16 I do not wish to be limited to such a position or to the specific construction of the parts. Broadly speaking I employ a member of large circular form to get as much length as possible and I position it as close as practicable to the source of heat which is the braking surface of the shoe.

It is thus evident that my brake when constructed as described above will not overheat or over-adjust itself. This permits a system of four brakes on an automobile to be operated by one brake pedal without danger of one or more brakes becoming too powerful with respect to the others.

While I have described a brake anchoring member which moves in a predetermined direction relative to the other parts of the brake as the temperature of the member and brake parts rises, I wish also to indicate that the expansion strap 14 can be made of metal having a lower co-efficient of expansion than that of the other brake parts, so that the greater expansion of these parts would produce the same effect as if the strap 14 shortened in length pulling the end 19 down against end 20 and causing the anchor lever 12 to rotate in a counter-clockwise direction (Fig. 1). The resultant rotation of brake shoe and lever 28 will be opposite to the direction of arrows A and B and the tension in pull wire 33 will be increased rather than reduced, thus increasing the brake power. The above arrangement would be useful on brakes for airplanes as airplane wheels and brakes are usually made of aluminum alloys and the expansion due to heat is extensive, causing considerable foot pedal movement to follow it up. In such a construction the use of a steel strap 14 would reduce this pedal movement considerably and thereby make it possible to increase the pedal leverage and give the pilot an easier brake. This action could not be properly maintained however, without my thermo-controlled ratchet lever to delay the adjusting action of the brake, as in the use of an ordinary type of ratchet lever the movement of the thermo-controlled brake anchorage would act to increase the stroke of such lever, thereby advancing the adjusting action and causing the brake to overadjust itself to the point where it would refuse to release.

The structure shown herein which is responsive to the temperature of the brake to control the adjustment thereof is broadly covered in my co-pending application #562,550 filed September 12, 1931 for Automatic brake adjusting mechanism.

I claim:

1. In a brake, a drum, friction means for engaging the drum, and a movable anchoring mechanism for said friction means including a member having a different co-efficient of expansion from the other parts of the brake and controlling the position of the anchoring mechanism during engagement of the drum by the friction means.

2. In a brake, a drum, friction means for engaging the drum, and an anchoring mechanism for said friction means movable in one direction in response to increasing temperature of the brake and in the opposite direction in response to decreasing temperature of the brake to vary the angular position of the friction means about the axis of the drum.

3. In a brake, a drum, friction means for engaging the drum, and an anchoring mechanism for said friction means yielding during brake application to the brake force of the friction means in response to increasing temperature of the brake.

4. In a brake, a brake drum, friction means for engaging the drum to arrest rotary movement of the latter, and an anchoring mechanism for the friction means movable in response to a change in brake temperature to change the drum arresting action of the friction means.

5. In a brake, a brake drum, friction means for arresting rotary movement of the drum, an automatic adjusting device for the friction means, said device including an operating lever responsive to a rise in brake temperature to retard its operative movement, and an anchoring mechanism for the friction means movable in response to an increase in brake temperature to vary the drum arresting action of the friction means.

6. In a brake, a drum, friction means for engaging the drum, and an automatic adjusting device for the friction means including an operating lever having an arm whose curvature increases with the temperature of the brake.

7. In a brake, a drum, friction means for engaging the drum, and an extensible device for automatically adjusting the friction means, said device including a ratchet wheel rotatable to extend the device, a movable pawl for operating said wheel, and a fixed pawl supporting said movable pawl and locking said wheel against movement in either direction.

8. In a brake, a drum, friction means for engaging the drum, and an automatic adjusting device for the friction means to compensate for wear, including an operating pawl a portion of which is constructed of metal strips of different co-efficients of expansion, secured together along substantially their entire length.

9. In a brake, a drum, a braking member having a part engageable with said drum, and a device for varying the braking action of said braking member, said device including a thermo-sensitive expansion ring element paralleling said part of the braking member and in close proximity thereto.

10. In a brake, a drum having a flange, a backing plate having a groove receiving said flange, a braking member for exerting a braking torque, and a device for controlling the torque of said braking member, said device including a thermo-sensitive element positioned in said groove.

GEORGE L. SMITH.